(12) United States Patent
Saito

(10) Patent No.: US 7,512,637 B2
(45) Date of Patent: Mar. 31, 2009

(54) STORAGE SYSTEM AND UNDO PROCESSING METHOD

(75) Inventor: Takeshi Saito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 172 days.

(21) Appl. No.: 11/337,689

(22) Filed: Jan. 24, 2006

(65) Prior Publication Data

US 2007/0112872 A1 May 17, 2007

(30) Foreign Application Priority Data

Nov. 15, 2005 (JP) ............................. 2005-329896

(51) Int. Cl.
*G06F 17/30* (2006.01)
*G06F 15/16* (2006.01)

(52) U.S. Cl. ........................... 707/200; 707/8; 707/201; 707/202; 707/203; 707/204; 711/114; 711/162; 713/16; 713/178; 713/200; 714/2; 714/7; 714/14; 714/15; 714/19

(58) Field of Classification Search ....................... None
See application file for complete search history.

(56) References Cited

U.S. PATENT DOCUMENTS

| | | | | |
|---|---|---|---|---|
| 5,862,386 | A * | 1/1999 | Joseph et al. | 717/170 |
| 6,185,577 | B1 * | 2/2001 | Nainani et al. | 707/202 |
| 6,185,699 | B1 * | 2/2001 | Haderle et al. | 714/19 |
| 6,836,821 | B2 * | 12/2004 | Moore et al. | 711/114 |
| 6,944,711 | B2 * | 9/2005 | Mogi et al. | 711/113 |
| 7,093,088 | B1 * | 8/2006 | Todd et al. | 711/162 |
| 2004/0243945 | A1 * | 12/2004 | Benhase et al. | 715/853 |

FOREIGN PATENT DOCUMENTS

| JP | 2003-108412 | 10/2001 |
|---|---|---|
| JP | 2003-345632 | 5/2002 |

* cited by examiner

*Primary Examiner*—Tony Mahmoudi
*Assistant Examiner*—James J Wilcox
(74) *Attorney, Agent, or Firm*—Reed Smith LLP; Juan Carlos A. Marquez, Esq.

(57) ABSTRACT

A storage system and an undo processing method that can facilitate undo processing for configuration change operations that have been performed for storage apparatuses by different administrators. A management server manages the history of configuration change operations it performs for storage apparatuses while a storage apparatus manages the history of configuration changes it makes in itself in accordance with the configuration change operations performed by the management server. When the storage apparatus receives a request to undo a configuration change operation from a management server, if the undo target configuration change operation or its relevant configuration change operations performed after the undo target configuration change operation have not involved a further relevant configuration change operation for another storage apparatus, the storage apparatus performs undo processing only for the configuration change made in accordance with the undo target configuration change operation, and if they have involved a further relevant configuration change operation for another storage apparatus, the storage apparatus makes a request to the management server that performed the further relevant configuration change operation to undo it.

8 Claims, 17 Drawing Sheets

FIG.3

| DEVICE ID | REGISTRATION NUMBER | CATEGORY | UNDO ELEMENT ||||| 38 |
| | | | UNDO TYPE | LDEV ID | Port ID | Host ID | RELEVANT DEVICE ||
| | | | | | | | ID | REGISTRATION NUMBER |
| DEVICE 1 | 1 | Path | CANCEL | 0:00 | PortA | HostA | | |
| DEVICE 2 | 2 | Pair | CANCEL | 0:00 | | | DEVICE 2 | 3 |
| DEVICE 3 | 3 | Pair | CANCEL | 0:01 | | | DEVICE 1 | 2 |
| 70 | 71 | 72 | 73 | 75 | 76 | 77 | 79 | 80 |

FIG.4

| REGISTRATION NUMBER | MANAGEMENT SERVER ID | CATEGORY | UNDO TYPE | PATH TYPE | UNDO ELEMENT | | | | | 61 |
|---|---|---|---|---|---|---|---|---|---|---|
| | | | | | LDEV ID | Port ID | Host ID | RELEVANT DEVICE | | |
| | | | | | | | | ID | REGISTRATION NUMBER | |
| 90 | 91 | 92 | 93 | 94 | 96 | 97 | 98 | 100 | 101 | |
| | | | | | | | | 99 | | |
| | | | | 95 | | | | | | |

| DEVICE ID | REGISTRATION NUMBER | CATEGORY | UNDO TYPE | UNDO ELEMENT ||| |||
|---|---|---|---|---|---|---|---|---|
| | | | | LDEV ID | Port ID | Host ID | RELEVANT DEVICE ||
| | | | | | | | ID | REGISTRATION NUMBER |
| DEVICE 1 | 1 | Path | CANCEL | 0:00 | PortA | HostA | | |
| DEVICE 1 | 2 | Path | CANCEL | 0:01 | PortA | HostB | | |
| DEVICE 1 | 3 | Path | CANCEL | 0:02 | PortB | HostA | | |
| DEVICE 1 | 6 | Path | CANCEL | 0:03 | PortB | HostA | | |
| DEVICE 1 | 7 | Path | CANCEL | 0:04 | PortC | HostB | | |

70　71　72　73　75　76　77　79　80
　　　　　　　　　　　　　　　98　38

(B)

| DEVICE ID | REGISTRATION NUMBER | CATEGORY | UNDO TYPE | UNDO ELEMENT ||| |||
|---|---|---|---|---|---|---|---|---|
| | | | | LDEV ID | Port ID | Host ID | RELEVANT DEVICE ||
| | | | | | | | ID | REGISTRATION NUMBER |
| DEVICE 1 | 4 | Pair | CANCEL | 0:00 | | | DEVICE 1 | 5 |
| DEVICE 1 | 5 | Pair | CANCEL | 0:02 | | | DEVICE 1 | 4 |
| DEVICE 1 | 8 | Pair | CANCEL | 0:04 | | | DEVICE 1 | 9 |
| DEVICE 1 | 9 | Pair | CANCEL | 0:03 | | | DEVICE 1 | 8 |

70　71　72　73　75　76　77　79　80
　　　　　　　　　　　　　　　98　38

(C)

| REGISTRATION NUMBER | SERVER ID | CATEGORY | UNDO TYPE | PATH TYPE | UNDO ELEMENT |||||
|---|---|---|---|---|---|---|---|---|---|
| | | | | | LDEV ID | Port ID | Host ID | RELEVANT DEVICE ||
| | | | | | | | | ID | REGISTRATION NUMBER |
| 1 | SERVER A | Path | CANCEL | Out-band | 0:00 | PortA | HostA | | |
| 2 | SERVER A | Path | CANCEL | Out-band | 0:01 | PortA | HostB | | |
| 3 | SERVER A | Path | CANCEL | Out-band | 0:02 | PortB | HostA | | |
| 4 | SERVER B | Pair | CANCEL | In-band | 0:01 | | | DEVICE 1 | 5 |
| 5 | SERVER B | Pair | CANCEL | In-band | 0:02 | | | DEVICE 1 | 4 |
| 6 | SERVER A | Path | CANCEL | Out-band | 0:03 | PortB | HostA | | |
| 7 | SERVER A | Path | CANCEL | Out-band | 0:04 | PortC | HostB | | |
| 8 | SERVER B | Pair | CANCEL | In-band | 0:04 | | | DEVICE 1 | 9 |
| 9 | SERVER B | Pair | CANCEL | In-band | 0:03 | | | DEVICE 1 | 8 |

| DEVICE ID | REGISTRATION NUMBER | CATEGORY | UNDO TYPE | UNDO ELEMENT ||| RELEVANT DEVICE ||
|---|---|---|---|---|---|---|---|---|
| | | | | LDEV ID | Port ID | Host ID | ID | REGISTRATION NUMBER |
| DEVICE 1 | 1 | Path | CANCEL | 0:00 | PortA | HostA | | |
| | | | | | | | | |
| DEVICE 1 | 3 | Path | CANCEL | 0:02 | PortB | HostA | | |
| DEVICE 1 | 6 | Path | CANCEL | 0:03 | PortB | HostA | | |
| DEVICE 1 | 7 | Path | CANCEL | 0:04 | PortC | HostB | | |

70  71  72  73  75  76  77  79  80
                                98  38

(B)

| DEVICE ID | REGISTRATION NUMBER | CATEGORY | UNDO TYPE | UNDO ELEMENT ||| RELEVANT DEVICE ||
|---|---|---|---|---|---|---|---|---|
| | | | | LDEV ID | Port ID | Host ID | ID | REGISTRATION NUMBER |
| | | | | | | | | |
| | | | | | | | | |
| DEVICE 1 | 8 | Pair | CANCEL | 0:04 | | | DEVICE 1 | 9 |
| DEVICE 1 | 9 | Pair | CANCEL | 0:03 | | | DEVICE 1 | 8 |

70  71  72  73  75  76  77  79  80
                                98  38

(C)

| REGISTRATION NUMBER | SERVER ID | CATEGORY | UNDO TYPE | PATH TYPE | UNDO ELEMENT ||| RELEVANT DEVICE ||
|---|---|---|---|---|---|---|---|---|---|
| | | | | | LDEV ID | Port ID | Host ID | ID | REGISTRATION NUMBER |
| 1 | SERVER A | Path | CANCEL | Out-band | 0:00 | PortA | HostA | | |
| | | | CANCEL | | | | | | |
| 3 | SERVER A | Path | CANCEL | Out-band | 0:02 | PortB | HostA | | |
| | | | | | | | | | |
| 6 | SERVER A | Path | CANCEL | Out-band | 0:03 | PortB | HostA | | |
| 7 | SERVER A | Path | CANCEL | Out-band | 0:04 | PortC | HostB | | |
| 8 | SERVER B | Pair | CANCEL | In-band | 0:04 | | | DEVICE 1 | 9 |
| 9 | SERVER B | Pair | CANCEL | In-band | 0:03 | | | DEVICE 1 | 8 |

| DEVICE ID | REGISTRATION NUMBER | CATEGORY | UNDO TYPE | UNDO ELEMENT | | | | |
|---|---|---|---|---|---|---|---|---|
| | | | | LDEV ID | Port ID | Host ID | RELEVANT DEVICE | |
| | | | | | | | ID | REGISTRATION NUMBER |
| DEVICE 1 | 1 | Path | CANCEL | 0:01 | PortA | HostA | | |
| DEVICE 2 | 1 | Path | CANCEL | 0:10 | PortB | HostA | | |

70  71  72  73  75  76  77  79  80
                                98  38

(B)

74

| DEVICE ID | REGISTRATION NUMBER | CATEGORY | UNDO TYPE | UNDO ELEMENT | | | | |
|---|---|---|---|---|---|---|---|---|
| | | | | LDEV ID | Port ID | Host ID | RELEVANT DEVICE | |
| | | | | | | | ID | REGISTRATION NUMBER |
| DEVICE 1 | 2 | Pair | CANCEL | 0:01 | | | DEVICE 2 | 2 |
| DEVICE 2 | 2 | Pair | CANCEL | 0:10 | | | DEVICE 1 | 2 |

70  71  72  73  75  76  77  79  80
                                98  38

(C)

95

| REGISTRATION NUMBER | SERVER ID | CATEGORY | UNDO TYPE | PATH TYPE | UNDO ELEMENT | | | | |
|---|---|---|---|---|---|---|---|---|---|
| | | | | | LDEV ID | Port ID | Host ID | RELEVANT DEVICE | |
| | | | | | | | | ID | REGISTRATION NUMBER |
| 1 | SERVER A | Path | CANCEL | Out-band | 0:01 | PortA | HostA | | |
| 2 | SERVER B | Pair | CANCEL | In-band | 0:01 | | | DEVICE 2 | 1 |

90  91  92  93  94  96  97  98  100  101
                                     99  61

(D)

95

| REGISTRATION NUMBER | SERVER ID | CATEGORY | UNDO TYPE | PATH TYPE | UNDO ELEMENT | | | | |
|---|---|---|---|---|---|---|---|---|---|
| | | | | | LDEV ID | Port ID | Host ID | RELEVANT DEVICE | |
| | | | | | | | | ID | REGISTRATION NUMBER |
| 1 | SERVER A | Path | CANCEL | Out-band | 0:10 | PortB | HostA | | |
| 2 | SERVER B | Pair | CANCEL | In-band | 0:10 | | | DEVICE 1 | 2 |

| DEVICE ID | REGISTRATION NUMBER | CATEGORY | UNDO TYPE | UNDO ELEMENT 74 | | | | |
|---|---|---|---|---|---|---|---|---|
| | | | | LDEV ID | Port ID | Host ID | RELEVANT DEVICE | |
| | | | | | | | ID | REGISTRATION NUMBER |
| DEVICE 2 | 1 | Path | CANCEL | 0:10 | PortB | HostA | | |
| | | | | | | | | |
| 70 | 71 | 72 | 73 | 75 | 76 | 77 | 79 | 80 |
| | | | | | | | 98 | 38 |

(B)

| DEVICE ID | REGISTRATION NUMBER | CATEGORY | UNDO TYPE | UNDO ELEMENT 74 | | | | |
|---|---|---|---|---|---|---|---|---|
| | | | | LDEV ID | Port ID | Host ID | RELEVANT DEVICE | |
| | | | | | | | ID | REGISTRATION NUMBER |
| | | | | | | | | |
| | | | | | | | | |
| 70 | 71 | 72 | 73 | 75 | 76 | 77 | 79 | 80 |
| | | | | | | | 98 | 38 |

(C)

| REGISTRATION NUMBER | SERVER ID | CATEGORY | UNDO TYPE | PATH TYPE | UNDO ELEMENT 95 | | | | |
|---|---|---|---|---|---|---|---|---|---|
| | | | | | LDEV ID | Port ID | Host ID | RELEVANT DEVICE | |
| | | | | | | | | ID | REGISTRATION NUMBER |
| | | | | | | | | | |
| | | | | | | | | | |
| 90 | 91 | 92 | 93 | 94 | 96 | 97 | 98 | 100 | 101 |
| | | | | | | | | 99 | 61 |

(D)

| REGISTRATION NUMBER | SERVER ID | CATEGORY | UNDO TYPE | PATH TYPE | UNDO ELEMENT 95 | | | | |
|---|---|---|---|---|---|---|---|---|---|
| | | | | | LDEV ID | Port ID | Host ID | RELEVANT DEVICE | |
| | | | | | | | | ID | REGISTRATION NUMBER |
| 1 | SERVER A | Path | CANCEL | Out-band | 0:10 | PortB | HostA | | |
| | | | | | | | | | |
| 90 | 91 | 92 | 93 | 94 | 96 | 97 | 98 | 100 | 101 |
| | | | | | | | | 99 | 61 |

STORAGE SYSTEM AND UNDO PROCESSING METHOD

CROSS REFERENCES TO RELATED APPLICATIONS

This application relates to and claims priority from Japanese Patent Application No. 2005-329896, filed on Nov. 15, 2005, the entire disclosure of which is incorporated herein by reference.

BACKGROUND OF THE INVENTION

The present invention relates to a storage system and an undo processing method. The present invention is preferably applied to a storage system where different system administrators perform different configuration change operations for storage apparatuses.

In a conventional storage system where plural storage apparatuses are connected to each other via a Storage Area Network (SAN), system administrators with different roles perform configuration change operations such as setting and deletion of paths and copy-pairs for the storage apparatuses using different management servers.

Japanese Patent Laid-Open (Kokai) Publication No. 2003-108412 discloses an invention related to a method for updating configuration information for storage apparatuses, the updating being required in configuration changes in the storage apparatuses. Japanese Patent Laid-Open (Kokai) Publication No. 2003-345632 discloses an invention related to a method for analyzing information about the states of storage apparatuses and managing the storage apparatuses based on the analysis results.

SUMMARY OF THE INVENTION

In a conventional storage system, when different system administrators perform different configuration change operations for storage apparatuses, for example, when a system administrator sets a path for a logical volume in a storage apparatus and then another system administrator pairs the logical volume with another logical volume, and an administrator wishes to cancel some of the configuration change operations, that is, to execute undo processing, he/she has to contact the administrator(s) who performed the configuration change operations after him/her, in order to cancel the configuration change operations they performed themselves in reverse order to how the changes have been made.

In a storage system like the one above, a configuration change for a storage apparatus once made cannot be easily undone; accordingly, a technique for easily performing undo processing has been sought after.

The present invention has been devised considering the above points and aims to suggest a storage system and an undo processing method that can facilitate undo processing for configuration change operations that have been performed by different system administrators.

In order to achieve that, the present invention provides a storage system having a plurality of management servers and one or more storage apparatuses that change their own configurations in accordance with configuration change operations performed by the management servers. In the storage system, each of the management servers has a server-side configuration change management unit for managing the history of configuration change operations it performs for the storage apparatuses; and each of the storage apparatuses has a storage apparatus-side configuration change management unit for managing the history of configuration changes it makes in itself in accordance with the configuration change operations performed by the management servers. A server-side configuration change management unit transmits, when necessary, a request to undo a configuration change operation to a storage apparatus. When the storage apparatus-side configuration change management unit receives the request to undo the configuration change operation, it judges whether the undo target configuration change operation and its relevant configuration change operations performed after the target configuration change operation have involved a further relevant configuration change operation for another storage apparatus, and if they have not involved a further relevant configuration change operation for another storage apparatus, the storage apparatus-side configuration change management unit performs undo processing only for the configuration change made in accordance with the target configuration change operation, but if they have involved a further relevant configuration change operation for another storage apparatus, the storage apparatus-side configuration change management unit makes a request to the management server that performed the further relevant configuration change operation to undo it. In response to the request for undo processing from the storage apparatus, the server-side configuration change management unit transmits an undo request requesting undo processing for the further relevant configuration change operation to the corresponding storage apparatus.

Consequently, in the storage system, configuration change operations performed by a single storage apparatus are undone by the storage apparatus itself while configuration change operations that could not be performed by a single storage apparatus but involved plural storage apparatuses are undone by the management servers that performed the configuration change operations. Therefore, even if plural management servers perform configuration change operations for storage apparatuses, system administrators do not have to contact each other, and each can individually cancel their own configuration change operations themself The present invention also provides an undo processing method for undoing configuration changes that have been made in storage apparatuses in accordance with configuration change operations by a plurality of management servers, each of the management servers managing the history of configuration change operations it performs for the storage apparatuses; and each of the storage apparatuses managing the history of configuration changes it makes in itself in accordance with the configuration change operations by the management servers. The method includes: a first step where a management server transmits, when necessary, a request to undo a configuration change operation to a storage apparatus; a second step where, when the storage apparatus receives the request to undo the target configuration change operation, it judges whether the undo target configuration change operation and its relevant configuration change operations performed after the target configuration change operation have involved a further relevant configuration change operation for another storage apparatus, and if they have not involved a further relevant configuration change operation, the storage apparatus performs the undo processing only for a configuration change made in accordance with the target configuration change operation, but if they have involved a further relevant configuration change operation for another storage apparatus, the storage apparatus requests the management server that has performed the further relevant configuration change operation to undo it; and a third step where, in response to the request for the undo processing from the storage apparatus, the management server transmits an undo request requesting undo processing for the further relevant configuration change operation to the corresponding storage apparatus.

With the undo processing method, configuration change operations performed by a single storage apparatus are undone by the storage apparatus itself while configuration change operations that could not be performed by a single storage apparatus but involved plural storage apparatuses are undone by the management servers that performed the configuration change operations. Therefore, even if plural management servers perform configuration change operations for storage apparatuses, system administrators do not have to contact each other, and each can individually cancel their own configuration change operations by themself.

According to the present invention, it is possible to realize a storage system and an undo processing method that can facilitate undo processing for configuration change operations that have been performed for storage apparatuses by different system administrators.

BRIEF DESCRIPTION OF THE DRAWINGS

FIG. 3 shows an undo management table.

FIG. 4 shows a configuration change management table.

FIG. 13(A) shows the structure of an undo management table in a first management server in Example 1, FIG. 13(B) shows the structure of an undo management table in a second management server in Example 1, and FIG. 13 (C) shows the structure of a configuration change management table in a storage apparatus in Example 1.

FIG. 15(A) shows the structure of the undo management table in the first management server in Example 1, FIG. 15(B) shows the structure of the undo management table in the second management server in Example 1, and FIG. 15(C) shows the structure of the configuration change management table in the storage apparatus in Example 1.

FIG. 17(A) shows the structure of an undo management table in a first management server in Example 2, FIG. 17(B) shows the structure of an undo management table in a second management server in Example 2, FIG. 17(C) shows the structure of a configuration change management table in a first storage apparatus in Example 2, and FIG. 17(D) shows the structure of a configuration change management table in a second storage apparatus in Example 2.

FIG. 19(A) shows the structure of the undo management table in the first management server in Example 2, FIG. 19(B) shows the structure of the undo management table in the second management server in Example 2, FIG. 19(C) shows the structure of the configuration change management table in the first storage apparatus in Example 2. FIG. 19(D) shows the structure of the configuration change management table in the second storage apparatus in Example 2.

DETAILED DESCRIPTION OF THE INVENTION

An embodiment of the present invention is described below in detail with reference to the attached drawings.

(1) Storage System Configuration According to the Embodiment

Figure 1:
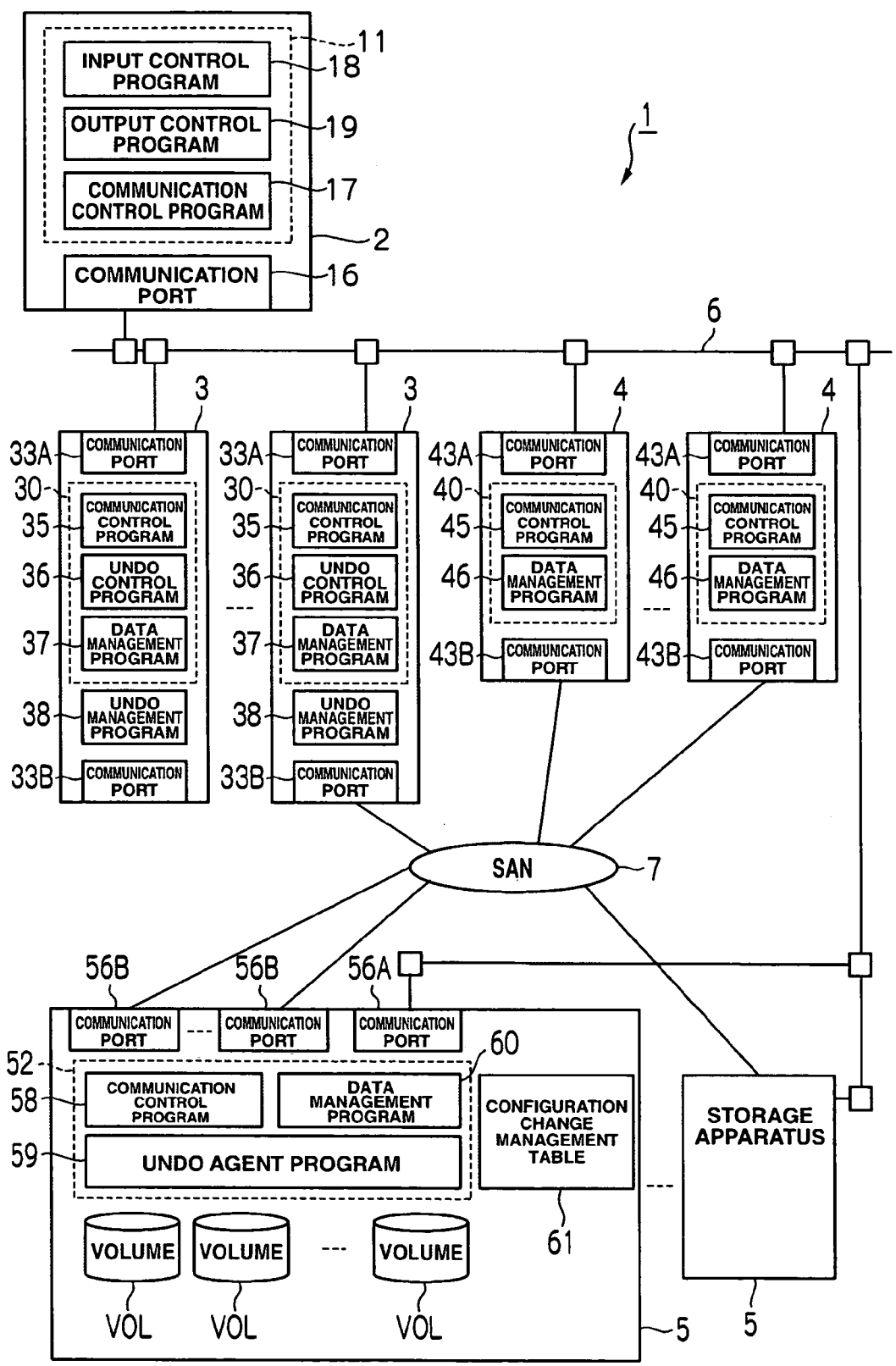
FIG. 1 is a block diagram showing the configuration of a storage system according to an embodiment of the present invention.
Figure 2:
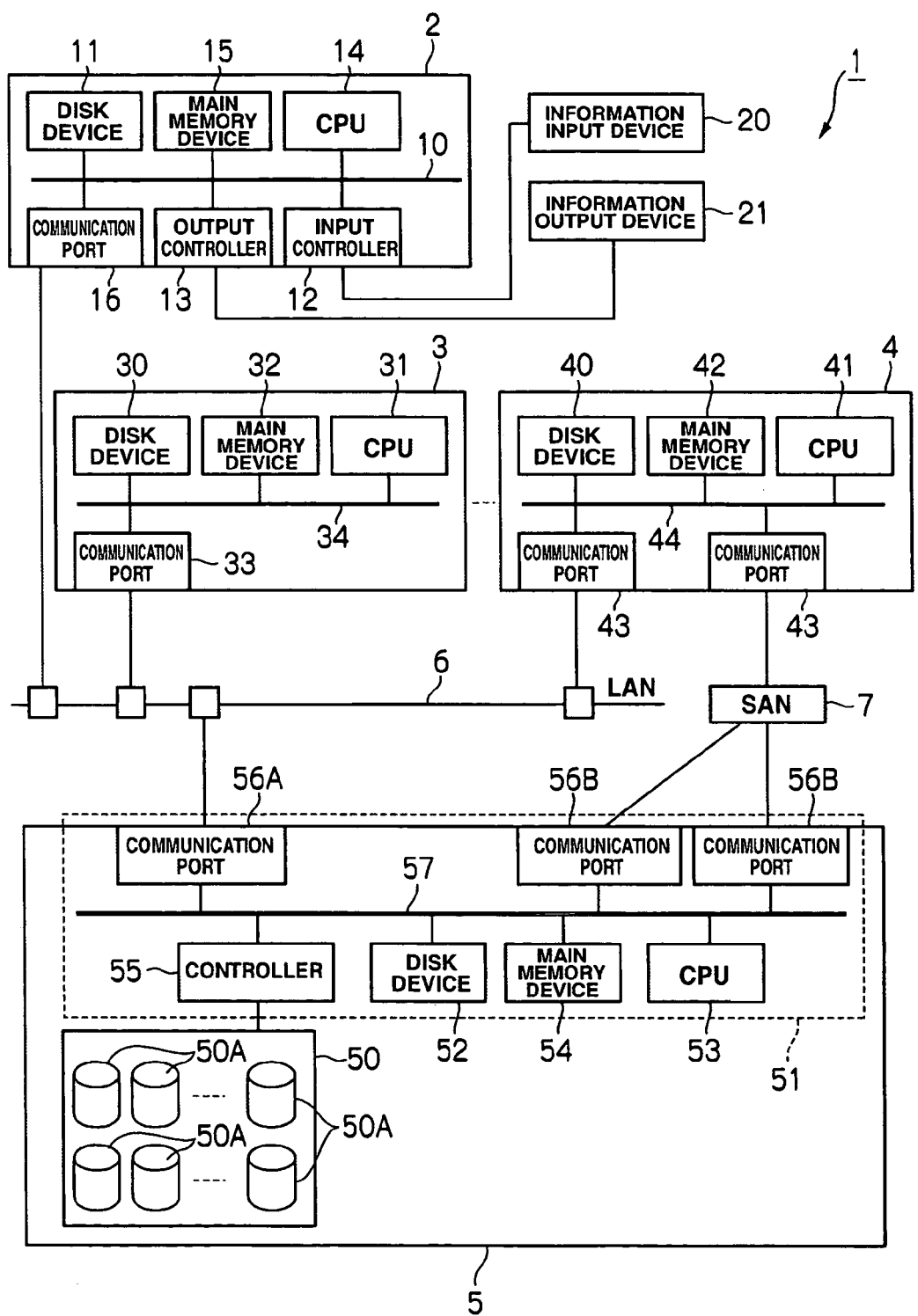
FIG. 2 is a block diagram also showing the configuration of the storage system according to the embodiment.

In FIGS. 1 and 2, the reference numeral 1 indicates an entire storage system according the embodiment. The storage system 1 has a structure where a management client 2, management servers 3, service servers 4, and storage apparatuses 5 are connected to one another via a Local Area Network (LAN) 6 to enable communication; and all of the service servers 4, all of the storage apparatuses 5, and at least one of the management servers 3 are connected to one another via a Storage Area Network (SAN) 7 to enable communication.

As shown in FIG. 2, the management client 2 is structured having a disk device 11, an input controller 12, an output controller 13, a central processing unit (CPU) 14, a main memory device 15, and a communication port 16, each being connected to one another via a bus 10.

The disk device 11 is configured with, for example, a hard disk device, and stores file data belonging to users and various control programs, such as a communication control program 17 for controlling data transmission and connection/disconnection with the other party to the communication, and an input control program 18 and output control program 19 that control data input and output performed by the input controller 12 and the output controller 13.

The input controller 12 is an interface for an information input device 20 such as a keyboard, switch, pointing device or a microphone, and interprets user-input commands from the information input device 20 connected thereto. The input controller 12 notifies the CPU 14 of its interpretation results via the bus 10. The output controller 13 is an interface for an information output device 21 such as a monitor display, and transmits image data to be shown on an operation screen as well as sound data read from the disk device 11 to the information output device 21 connected thereto.

The CPU 14 loads, into the main memory device 15, control programs such as the communication control program 17, input control program 18, and output control program 19 stored in the disk device 11; and executes required calculation and control processing based on those control programs and user-input commands transmitted via the input controller 12 from the information input device 20. The CPU 14 also transmits image data and sound data corresponding to the results of the calculation and control processing to the information output device 21 via the output controller 13; and has the information output device 21 display images corresponding to the image data and output sound corresponding to the sound data.

The main memory device 15 is configured with a semiconductor memory and used as work memory for the CPU 14. The communication port 16 is connected to the LAN 6 via a LAN cable.

Each management server 3 has a structure where a disk device 30, a CPU 31, a main memory device 32 and communication ports 33A and 33B, having the same functions as their corresponding parts in the management client 2, are connected to each other via a bus 34. It is connected to the LAN 6 and the SAN 7 via the communication ports 33A and 33B.

As shown in FIG. 1, a disk device 30 in each management server 3 stores various control programs such as a communication control program 35 similar to the communication control program 17 in the management client 2, an undo management program 36 and a data management program 37. The disk device 30 also stores an undo management table 38 for managing its own management server's history of configuration change operations performed for the storage apparatuses 5.

The CPU 31 loads, as necessary, the control programs and various data stored in the disk device 30 into the main memory device 32 and executes communication control processing like that above based on, for example, the communication control program 35. It also executes undo processing, which will be described later, based on the undo management program 36 and executes, based on the data management program 37, processing to refer to or update the undo management table 38 as instructed by the undo management program 36.

Just like the management server 3, each service server 4 has a structure where a disk device 40, a CPU 41, a main memory device 42, and communication ports 43A and 43B, having the same functions as their corresponding parts in the management client 2, are connected to each other via a bus 44. It is connected to the LAN 6 via the communication port 43A and to the SAN 7 via the communication port 43B.

As shown in FIG. 1, a disk device 40 in each service server 4 stores control programs such as a communication control program 35 similar to the communication control program 17 in the management client 2 and a data management program 46. The CPU 40 loads, as necessary, control programs into the main memory device 42 and executes communication control processing like that above based on the communication control program 45 while executing management processing for various data based on the data management program 46.

A storage apparatus 5 is structured having a disk portion 50 consisting of a plurality of data-storing disk units 50A; and a control unit 51 for controlling input and output of data to and from the disk portion 50.

Examples of the disk units 50A in the disk portion 50 include expensive disks such as Small Computer System Interface (SCSI) disks and inexpensive disks such as Serial AT Attachment (SATA) disks or optical disks.

The respective disk units 50A in the disk portion 50 are operated using a RAID method by the control unit 51. One or more disk units 50A provide physical storage areas, for which one or more logical volumes (hereinafter called the "logical volumes") VOL (FIG. 1) are set. Data transmitted from the service servers 4 is written in the logical volumes VOL in blocks of predetermined size (hereinafter called the "logical blocks").

Each logical volume VOL is given a unique identifier (hereinafter called the "Logical Unit Number (LUN)"). In the present embodiment, input and output of data is conducted by specifying an address, which is a combination of an LUN and a number (Logical Block Address (LBA)) unique to each logical block.

The control portion 51 has a structure where a disk device 52, a CPU 53, a main memory device 54, a controller 55 and communication ports 56A and 56B are connected to each other via a bus 57. The control portion 51 is connected to the LAN 6 via the communication port 56A and to the SAN 7 via the communication ports 56B.

As shown in FIG. 1, the disk device 52 stores various control programs such as a communication control program 58 similar to the communication control program 17 in the management client 2, an undo agent program 59, and a data management program 60. The disk device 52 also stores various data such as a configuration change management table 61 for managing the history of configuration change operations performed for its own storage apparatus, which will be described later.

The CPU 53 loads the control programs stored in the disk device 52 and various data such as the configuration change management table 61 into the main memory device 54; and executes communication control processing like that above based on the communication control program 58. It also executes undo processing, which will be described later, based on the undo agent program 59; and executes, based on the data management program 60, processing to refer to or update the configuration change management table 61 as instructed by the undo agent program 59.

The controller 55 functions as an interface for controlling protocols when communicating with the respective disk units 50A in the disk portion 50. It is connected to the respective disk units 50A via, for example, a Fibre Channel cable and transmits and receives data to and from them based on Fibre Channel Protocol.

(2) Undo Processing Function in Storage System 1

The undo processing function in the storage system 1 is explained below. In the storage system 1, each management server 3 has, in its disk device 30, an undo management table 38 as shown in FIG. 3 as means for managing the history of configuration change operations (the history including the contents of the undo processing for the configuration change operations) it has performed for the storage apparatuses 5.

The undo management table 38 consists of five fields (70 to 74)—a "storage ID" field, a "registration number" field, a "category" field, an "undo type" field, and an "undo element" field. The "storage ID" field 70 stores IDs (unique identification information such as serial numbers) for the storage apparatuses for which the management server 3 has performed configuration change operations, and the "registration number" field 71 stores registration numbers for entries for configuration change operations registered in the configuration change management table 61, which will be described later.

The "category" field 72 stores attributes of the respective configuration change operations and the "undo type" field 73 stores the contents (set or cancel) of the undo processing for the configuration change operations. For example, if a configuration change operation is setting or deletion of a path, "path" is entered in the "category" field 72 and if it is path setting, "cancel" is entered in the "undo type" field 73, and if it is path deletion, "set" is entered therein. If the configuration change operation is creating or deleting a copy-pair, "pair" is entered in the "category" field 72, and if it is copy-pair creation, "cancel" is entered in the "undo type" field 73 and if it is copy-pair setting, "set" is entered therein.

The "undo element" field 74 consists of four fields (75 to 78)—an "LDEV ID" field, a "port ID" field, a "host ID" field, and a "relevant apparatus" field.

The "LDEV ID" field 75 stores unique IDs (identification information) for the configuration change operation target logical volumes VOL (FIG. 1), and the "port ID" field 76 stores the unique IDs for the communication ports 33A and 33B for which paths to the corresponding logical volume VOL have been set. The "host ID" field 77 stores IDs (unique identification information such as serial numbers) for service servers 4 connected to the communication ports 33A and 33B stored in the "port ID" field 76.

If a management server 3 performs a configuration change operation for a storage apparatus 5 to set a path between a logical volume VOL with ID "0:00" and a service server with ID "Host A" via communication ports 33A and 33B with ID "ports A" so that they are connected to each other, the code "0:00" is entered in the "LDEV ID" field 75, the code "ports A" is entered in the "port ID" field 76, and the code "host A" is entered in the "host ID" field 77.

The "relevant apparatus" field 78 consists of two fields (79 and 80)—an "ID" field and a "registration number" field. If the configuration change operation corresponding to the present entry involved a further relevant configuration change operation for another storage apparatus 5, an ID (unique identification information such as a serial number) for the storage apparatus 5 for which the further relevant configuration change operation was performed is stored in the corresponding "ID" field 79; and a registration number for the entry of the further relevant configuration change operation registered in the configuration change management table 61 (FIG. 1) in that storage apparatuses 5 is stored in the corresponding "registration number" field 80.

For example, when a pair setting operation is performed to pair a first logical volume VOL in a first storage apparatus 5 with a second logical volume VOL in a second storage apparatus 5, an entry for the operation for the first storage apparatus 5 to pair the first logical volume VOL with the second logical volume VOL (hereinafter called the "first configuration change operation") and an entry for the operation for the second storage apparatus 5 to pair the second logical volume VOL with the first logical volume VOL are entered in the undo management table 38 in the management server 3 as shown in the second and third lines in the undo management table 38 in FIG. 3.

In this case, for the entry for the first configuration change operation (the entry in the second line in the undo management table 38 in FIG. 3), the ID of the second storage apparatus 5 is entered in the corresponding "ID" field in the "relevant apparatus" field 78, and a registration number for the entry for the first configuration change operation registered in the configuration change management table 61 in the second storage apparatus 5 is entered in the corresponding "registration number" field 80 in the "relevant apparatus" field 78. Also, for the entry for the second configuration change operation (the entry in the third line in the undo management table 38 in FIG. 3), the ID of the first storage apparatus 5 is entered in the corresponding "ID" field 79 in the "relevant apparatus" field 78, and a registration number for the entry for the second configuration change operation registered in the configuration change management table 61 in the first storage apparatus 5 is entered in the corresponding "registration number" field 80 in the "relevant apparatus" field 78.

In the storage system 1 according to the present embodiment, system administrators using the management servers 3 have fixed different roles, for example, one administrator uses a management server 3 only to set and delete paths while another administrator uses another management server 3 only to set and delete copy-pairs. Therefore, an entry for a configuration change operation to set or delete a path and an entry for a configuration change operation to set or delete a copy-pair are not registered in the same undo management table 38.

Each storage apparatus 5 has, in its disk device 52, a configuration change management table 61 as shown in FIG. 4 as means for managing the history of configuration change operations (including the contents of undo processing for the configuration change operations) the management servers 3 have performed.

As shown in FIG. 4, the configuration change management table 61 consists of five fields (90 to 95)—a "registration number" field 90, a "server ID" field 91, a "category" field 92, a "path type" field 94, an "undo type" field 93, and an "undo element" field 95.

The "registration number" field 90 stores registration numbers for the configuration change processing operations the storage apparatus 5 performed itself as requested by the management servers 3, and the "server ID" field 91 stores the IDs (serial numbers or network addresses such as IP addresses) of the management servers 3 that made those requests.

The "path type" field 94 stores information about the types of paths through which the requests were transmitted—the LAN 6 or the SAN 7. For example, if the path is the LAN 6, a code "out-band" is entered in the "path type" field 94 and if the path is the SAN 7, a code "in-band" is stored therein.

Just like in the undo management table 38 (FIG. 3), the "category" field 92 stores attributes of the respective configuration change operations and the "undo type" field 98 stores the contents of the undo processing for the configuration change operations.

The "undo element" field 95 consists of four fields (96 to 99)—an "LDEV ID" field, a "port ID" field, a "host ID" field, and a "relevant apparatus" field. The "relevant apparatus" field 99 consists of an "ID" field 100 and a "registration number" field 101. Pieces of data similar to that in the undo management table 38 are entered in the "LDEV ID" field 96, the "port ID" field 97, the "host ID" field 98, and the "ID" field 100 and the "registration number" field 101 in the "relevant apparatus" field 99.

Figure 5:
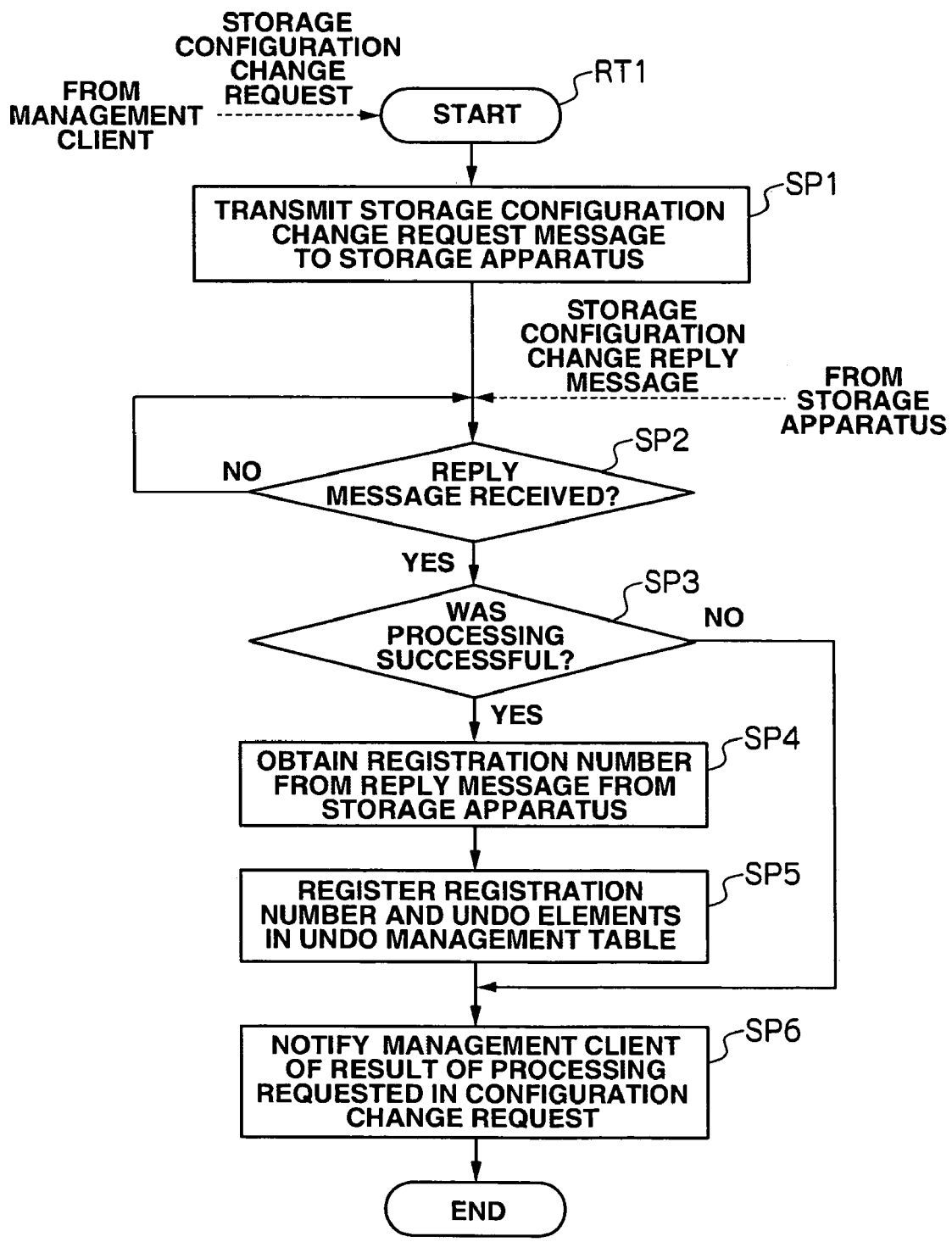
FIG. 5 is a flowchart showing a storage configuration change processing routine.

FIG. 5 is a flowchart showing the content of processing performed by a CPU 31 in a management server in relation to a configuration change operation to a storage apparatus 5. Based on the undo management program 36 (FIG. 1), the CPU 31 in the management server 3 performs a configuration change operation to change the configuration in a specified storage apparatus 5 to a designated configuration in accordance with the storage configuration change processing routine RT1 shown in FIG. 5.

When the CPU 31 receives a configuration change request with a target storage apparatus 5 and a specified configuration change content from the management client 2, it transmits to the storage apparatus 5 a configuration change request message including various information such as the ID of the target storage apparatus 5, the specific content of the configuration change, and the ID of the storage apparatus for which a further relevant configuration change operation is performed in relation to the present configuration change operation (SP1), and waits for a storage configuration change reply message from the target storage apparatus 5 (SP2).

Meanwhile, as will be described later in relation to FIG. 6, the target storage apparatus 5 executes configuration change processing to change its own configuration as designated based on the storage configuration change request message; and transmits the result of the configuration change processing as well as a registration number for an entry for successful configuration change operation registered in the configuration change management table 61 to the management server 3 as a storage configuration change reply message.

When the CPU 31 then receives the storage configuration change reply message (SP2: Yes), it judges, based on the storage configuration change reply message, whether the configuration change processing performed by the storage apparatus 5 in response to the storage configuration change request message was successful or not (SP3).

If the judgment is negative (SP3: No), the CPU 31 transmits, to the management client 2, an error message to the effect that the processing requested in the configuration change request failed (SP6) and terminates the storage configuration change processing.

Whereas, if the judgment is positive (SP3: Yes), the CPU 31 reads, from the storage configuration change reply message, the registration number for the corresponding entry registered in the configuration change management table 61; and registers necessary information including the registration number read above in the undo management table 38 (FIG. 3) as an entry for the configuration change operation.

The CPU 31 then transmits a message to the effect that the processing requested in the configuration change request was successful to the management client 2 (SP6) and terminates the storage configuration change processing.

Figure 6:
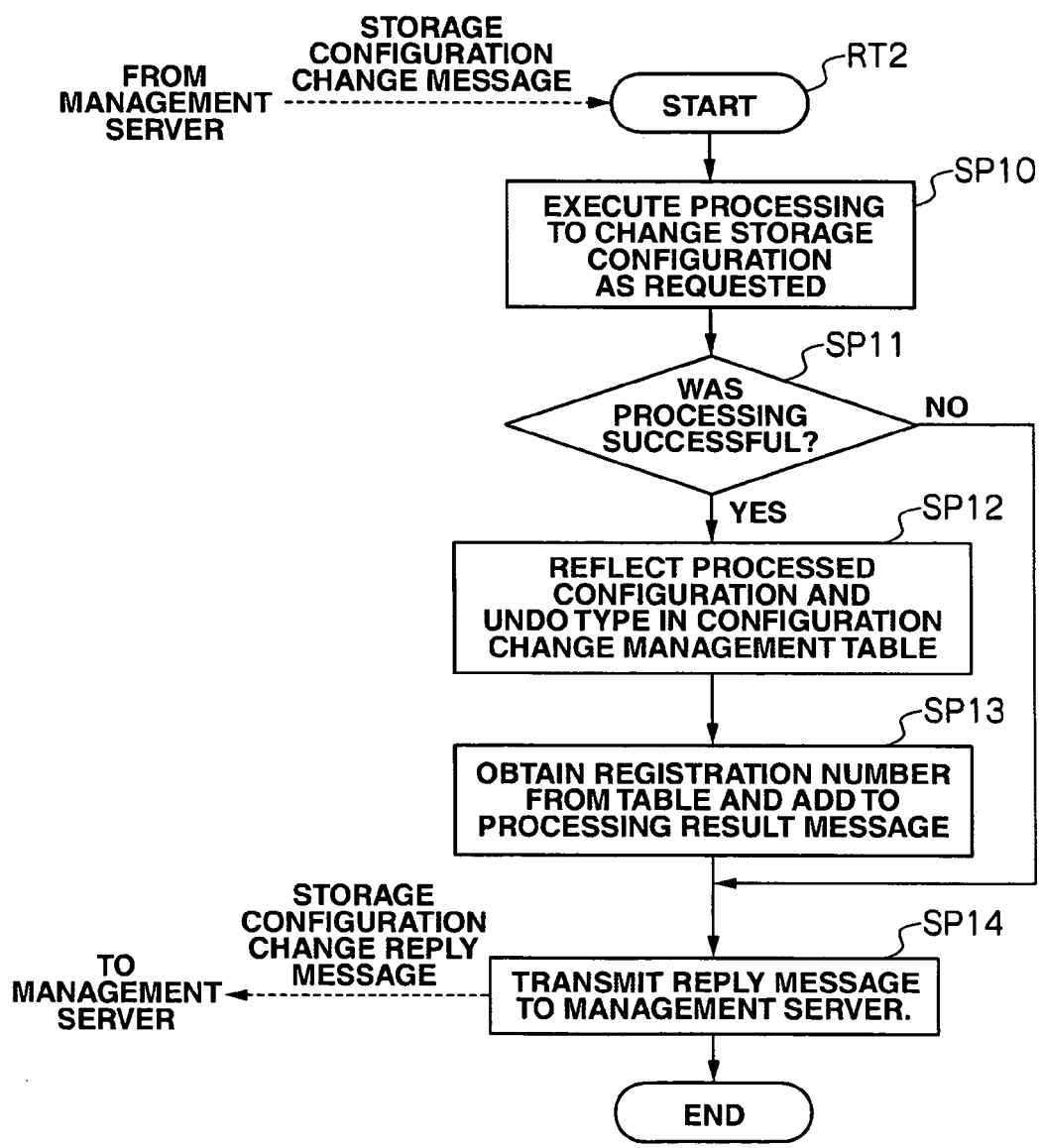
FIG. 6 is a flowchart showing a self-storage configuration change processing routine.

FIG. 6 is a flowchart showing the content of processing performed by a CPU 53 (FIG. 2) in a storage apparatus 5 that has received a storage configuration change request message. Based on the undo agent program 59 (FIG. 1), the CPU 53 in the storage apparatus 5 executes configuration change processing to change its own configuration as designated in accordance with the self-storage configuration change processing routine RT2 shown in FIG. 6.

When the CPU 53 receives a storage configuration change request message from a management sever 3, for example, it sets or deletes a path or a copy-pair, and changes the configuration in the storage apparatus 5 as designated (SP10). The CPU 53 then judges whether the self-storage configuration change processing was successful (SP11) and if it failed (SP11: No), it transmits a storage configuration change reply message to that effect to the management server 3 (SP1 4) and terminates the self-storage configuration change processing.

Whereas, if the self-storage configuration change processing was successful (SP11: Yes), the CPU 53 registers an entry for the configuration change operation in the configuration change management table 61 (FIG. 4) (SP1 2).

Subsequently, the CPU 53 obtains the registration number for the entry registered in the configuration change management table 61; creates a storage configuration change reply message by storing the obtained registration number and the result of the storage configuration change processing in predetermined positions; and transmits the message to the management server 3 (SP14). The CPU 53 then terminates the self-storage configuration change processing.

Figure 7:
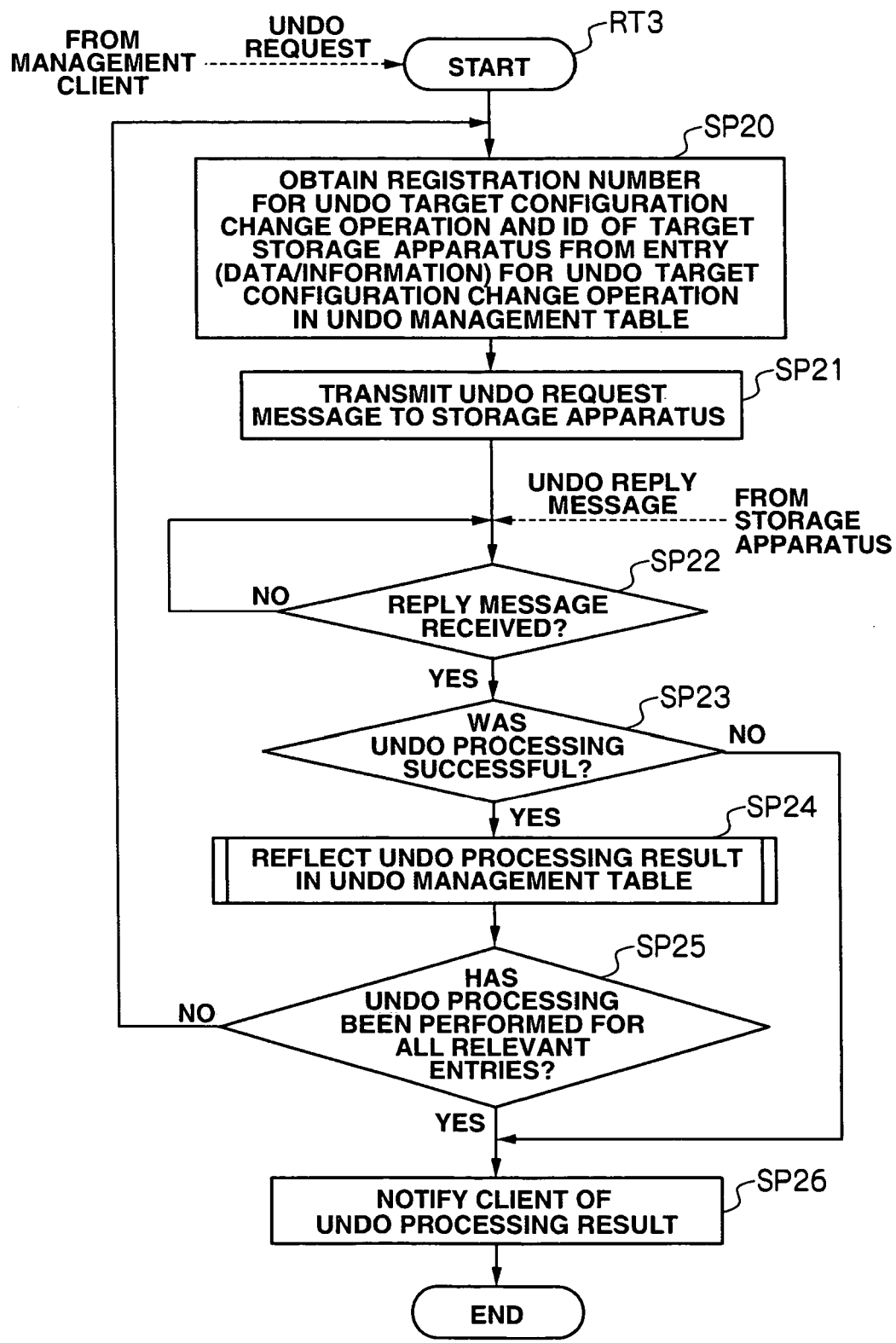
FIG. 7 is a flowchart showing an undo order processing routine.
Figure 8:
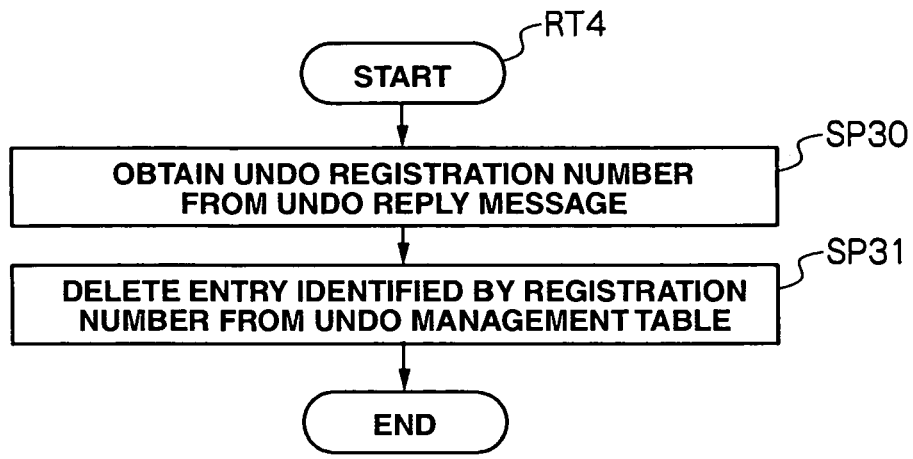
FIG. 8 is a flowchart showing a reflect undo processing result processing routine.

FIGS. 7 and 8 are flowcharts showing the content of processing performed by a CPU 31 (FIG. 2) in a management server 3 when it receives a request to execute processing to undo a specified configuration change operation (hereinafter called the "undo request") from the management client 2. Based on the undo management program 36 (FIG. 1) and the data management program 37 (FIG. 1), the CPU 31 has a target storage apparatus 5 execute undo processing for the specified configuration change operation in accordance with an undo order processing routine RT3 shown in FIG. 7 and a reflect undo processing result processing routine RT4 shown in FIG. 8.

When the CPU 31 receives the undo request from the management client 2, it instructs the data management program 37 (FIG. 1) to read, from the undo management table 38, the registration number for the undo target configuration change operation registered in the configuration change management table 61 and the ID of the target storage apparatus 5 (SP20).

When the CPU 31 then obtains the registration number and the ID of the storage apparatus 5, it creates, based on the registration number and the ID, an undo request message for requesting that the target storage apparatus perform designated undo processing.

Figure 9:
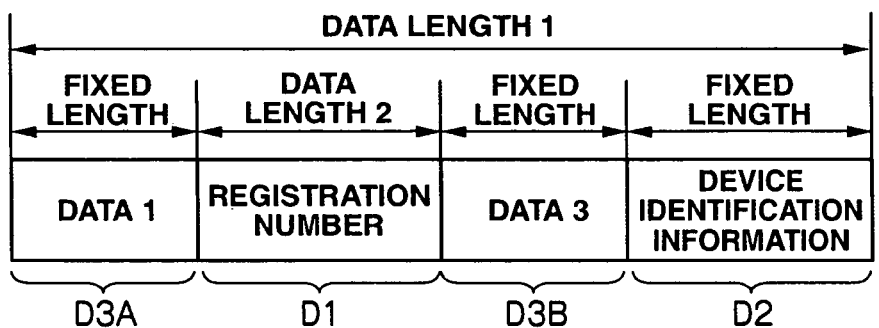
FIG. 9 is a schematic diagram showing the data format of an undo request message.

Note that an undo request message has a structure where, as shown in FIG. 9, fixed-length data Dl indicating a registration number for an undo target configuration change operation registered in the configuration change management table 61 (hereinafter called the "registration number data") and fixed-length data D2 indicating the ID of a storage apparatus 5 that the undo request message is addressed to, are arranged behind fixed-length headers D3A and D3B respectively.

Figure 10:
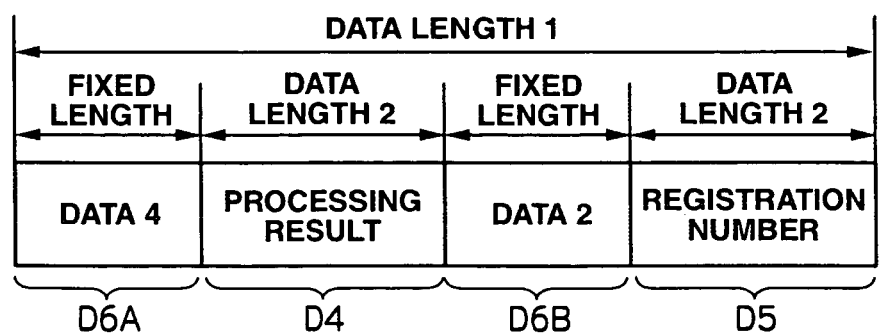
FIG. 10 is a schematic diagram showing the data format of an undo reply message.

After the CPU 31 creates the undo request message, it transmits it to the target storage apparatus 5 (SP21) and waits for an undo reply message as shown in FIG. 10 (SP22).

As will be described later in relation to FIG. 11, the target storage apparatus 5 executes the required necessary undo processing based on the undo request message and transmits, as an undo reply message, the result of the undo processing and a registration number for an entry for successful undo processing registered in the configuration change management table 61 to the management server 3.

As shown in FIG. 10, the undo reply message has a structure where fixed-length data D4 indicating the result of the undo processing (hereinafter called the "undo processing result data") and fixed-length registration number data D5 indicating the registration number of the entry for the undone configuration change operation registered in the configuration change management table 61 are arranged at the back of fixed-length headers D6A and D6B respectively.

When the CPU 31 then receives the undo reply message (SP22: Yes), it judges whether the undo processing was successful or not based on the undo reply message (SP23). If the judgment is negative (SP23: No), the CPU 31 transmits an error message to the management client 2 (SP26) and terminates the undo order processing.

Whereas, if the judgment is positive (SP23: Yes), the CPU 31 instructs the data management program 36 (FIG. 1) to reflect the result of the undo processing in the undo management table 38 (FIG. 3) (SP24). In this case, based on the data management program 36, the CPU 31 first reads, from the undo reply message, the registration number for the configuration change operation registered in the configuration change management table 61 (SP30) and deletes the entry including the registration number from the undo management table 38 (SP31) according to the reflect undo processing result processing routine RT4.

The CPU 31 then judges whether the undo processing has been performed for all the entries relevant to the deleted entry in the undo management table 38 (SP25) and if the judgment is negative (SP25: No), it returns to step SP20 and repeats the same processing for the rest of the relevant entries (SP20 to SP25).

For example, if an undo processing target specified in the undo request from the management client 2 is the pair setting operation whereby the first logical volume VOL in the first storage apparatus 5 was paired with the second logical volume VOL in the second storage apparatus 5 as described in relation to FIG. 3, the undo management table 38 stores the entry for the first configuration change operation performed for the first storage apparatus 5 to pair the first logical volume VOL with the second logical volume VOL (the second line in the undo management table 38 in FIG. 3) and the entry for the second configuration change operation performed for the second storage apparatus 5 to pair the second logical volume VOL to the first logical volume VOL (the third line in the undo management table 38 in FIG. 3).

Accordingly, in that case, even if one of the two entries is deleted from the undo management table 38 by the processing from step SP20 to step SP24, the other entry still remains in the undo management table 38 and so the CPU 31 makes a negative judgment in step SP25. Therefore, the CPU 31 returns to step SP20.

When the undo processing has been performed for all the relevant entries in the undo management table 38 (SP25: Yes), the CPU 31 notifies the management client 2 of the processing result (success) (SP26) and terminates the undo order processing.

For example, if an undo processing target specified in the undo request from the management client 2 is a path setting operation whereby a path was set between the logical volume VOL with the ID "0:00" and the service server 4 with the ID "Host A" via the communication ports 33A and 33B with the IDs "ports A" as described above in relation to FIG. 3, the undo management table 38 has no other entries relevant to the entry for the path setting operation (see FIG. 3). Therefore, the CPU 31 makes a positive judgment in step SP25. Accordingly, the CPU 31 notifies the management client 2 to the effect that the undo processing was successful and terminates the undo order processing.

Figure 11:
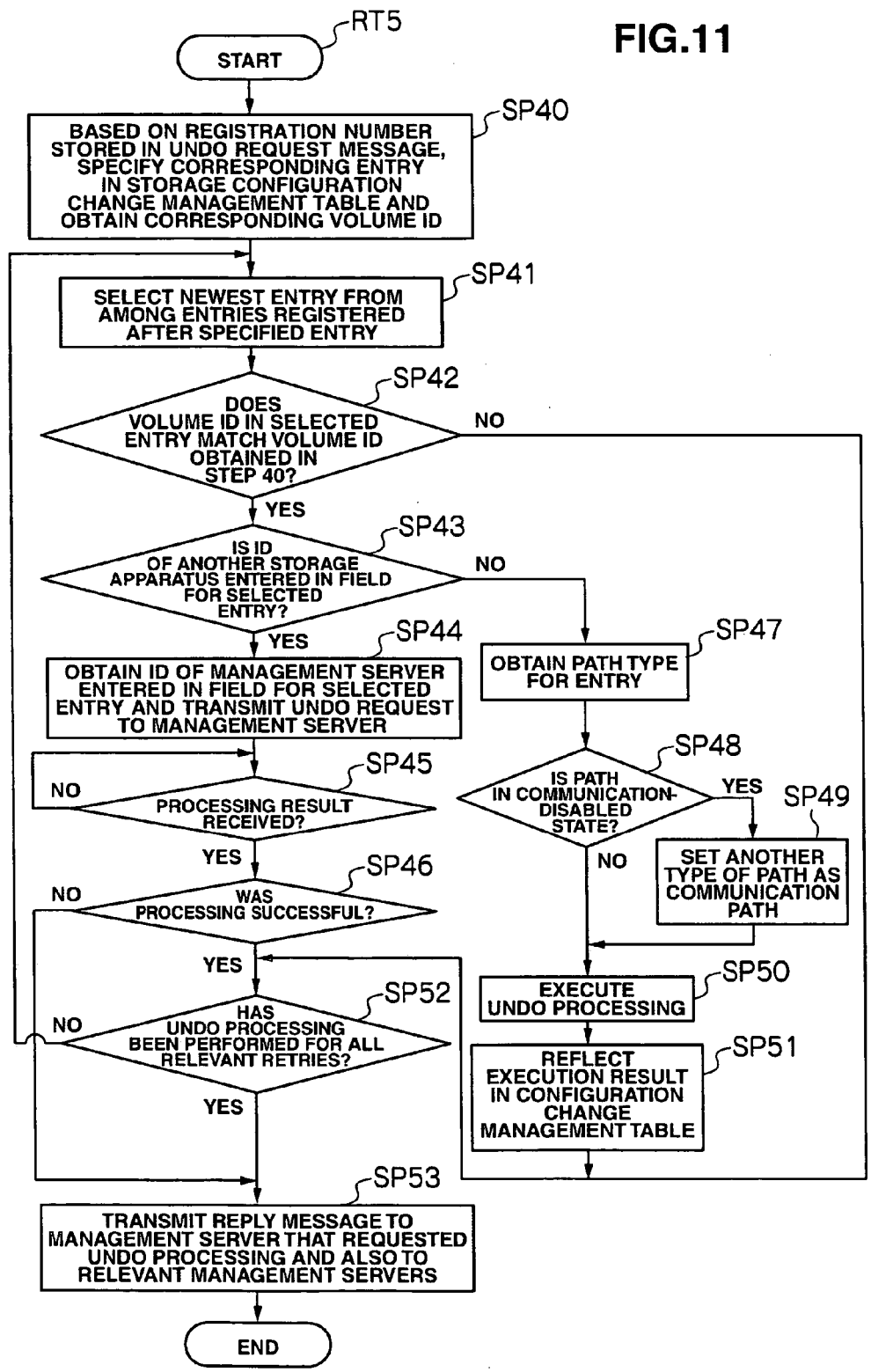
FIG. 11 is a flowchart showing an undo processing routine.

FIG. 11 is a flowchart indicating a processing routine performed by a CPU 53 in a storage apparatus 5 when it receives an undo request message from a management server 3. Based on the undo agent program 59 (FIG. 1), the CPU 53 executes undo processing as requested in the undo request message following the undo processing routine RT5 shown in FIG. 11.

When the CPU 53 receives an undo request message from a management server 3, it reads the registration number stored in the undo request message and specifies, based on the registration number, the entry for the undo target operation registered in the configuration change management table 61. It also reads the ID of a target logical volume from the corresponding "LDEV ID" field 96 in the "undo element" field 95 (FIG. 4) (SP40).

Subsequently, the CPU 53 selects, from among entries registered in the configuration change management table 61, an entry that has been registered after the entry specified in step SP40 and that also is the newest entry for which the processing described later in relation to steps SP41 to SP52 has not been performed yet (SP41).

The CPU 53 then reads data from the "LDEV ID" field 96 in the "undo element" field 95 for the selected entry and judges whether the data matches the LDEV ID obtained in step SP40 (SP42).

If the judgment is negative (SP42: No), the CPU 53 proceeds to step SP52, whereas if the judgment is positive (SP42: Yes), the CPU 53 further judges whether data for an ID and registration number for another storage apparatus 5 is stored in the "relevant apparatus" field 99 (FIG. 4) for the entry selected in step SP41 (SP43).

If the judgment is positive (SP43: Yes), it means that the configuration change operation corresponding to the selected entry has been performed for plural storage apparatuses 5 including its own storage apparatus 5. Therefore, the CPU 53 reads: the ID of the management serer 3 that performed the configuration change operation from the corresponding "host ID" field 98 in the "undo element" field 95 (FIG. 4); and the registration number stored in the corresponding "registration number" field 101 in the "relevant apparatus" field 99. The CPU 53 then creates an undo request message (FIG. 9) including the management server's ID and the registration number and transmits it to the management server 3, thereby requesting that the management server 3 perform the undo processing for the configuration change operation corresponding to the entry (SP44).

Just as in the case where the management server 3 receives an undo request from the management client 2, when the management server 3 receives the undo request message, it executes undo processing to undo the series of configuration change operations performed for the other storage apparatuses 5, following the undo order processing routine RT3 described above in relation to FIG. 7 and the reflect undo processing result processing routine RT4 described above in relation to FIG. 8. The management server 3 then transmits the result of the undo processing (success or failure) as an undo reply message (FIG. 10) to the storage apparatus 5 that transmitted the undo request message in step SP26 in the undo order processing routine RT3.

The CPU 53 in the storage apparatus 5 that has made a request of the management server 3 to perform the undo processing, then waits for an undo reply message from the management server 3 (SP45) and when it receives an undo reply message (SP45: Yes), it judges whether the undo processing it requested of the management server 3 was successful or not based on the undo reply message (SP46).

If the judgment is negative (SP46: No), the CPU 53 transmits an undo reply message to the effect that the requested undo processing has failed to the management server 3 that transmitted the undo request; and terminates the undo processing (SP53).

If the judgment is positive (SP46: Yes), the CPU 53 further judges whether the undo processing has been performed for all the relevant entries in the configuration change management table 61 (SP52) and if the judgment is negative (SP52: No), it executes the processing for the rest of the relevant entries (SP41 to SP52).

When the CPU 53 has performed undo processing for all the relevant entries in the configuration change management table 61 (SP52: Yes), it transmits an undo reply message to the effect that the requested undo processing was successful to the management server 3 (SP53) and terminates the undo processing.

If the judgment in step SP43 is negative (SP43: No), it means that the configuration change operation corresponding to the entry has not been performed involving other storage apparatuses 5 than its own storage apparatus 5. Therefore, the CPU 53 obtains the path type stored in the corresponding "path type" field 93 (FIG. 4) (SP48) and checks whether that path is in a communication-disabled state (SP48).

If the path is not in a communication-disabled state, the CPU 53 executes undo processing for the configuration change operation corresponding to the entry selected in step SP41 (SP50). It also performs the processing for the relevant configuration change operations performed for its own storage apparatus 5. Thereafter, it reflects the processing result in the configuration change management table 61, i.e., it deletes the entries for the undo-processed configuration change operations from the configuration change management table 61 (SP51).

The CPU 53 then proceeds to step SP52 and judges whether the undo processing has been performed for all the relevant entries in the configuration change management table 61 (SP52), and if the judgment is positive (SP52: Yes), the CPU 53 transmits an undo reply message to that effect to the management server 3 that transmitted the undo request message, and also to other relevant management servers 3 (SP53) and terminates the undo processing.

The management server 3, having transmitted the undo request message and received the undo reply message, reflects the result of the undo processing obtained from the undo reply message in its own undo management table 38 as described above in relation to step SP24 in FIG. 7. Likewise, the management servers 3 that have not transmitted undo request messages but have received the undo reply message, reflect the undo processing results obtained from the undo reply message in their own undo management tables 38 following the reflect undo processing result processing routine RT4 described in relation to FIG. 8. Specific examples are given below.

(2) EXAMPLES (2-1) Example 1

A specific example of the undo processing performed in the storage system 1 according to the present embodiment is given below. Explained is the case where a management server 3 performs configuration change operations that do not involve plural storage apparatuses 5.

Figure 12:
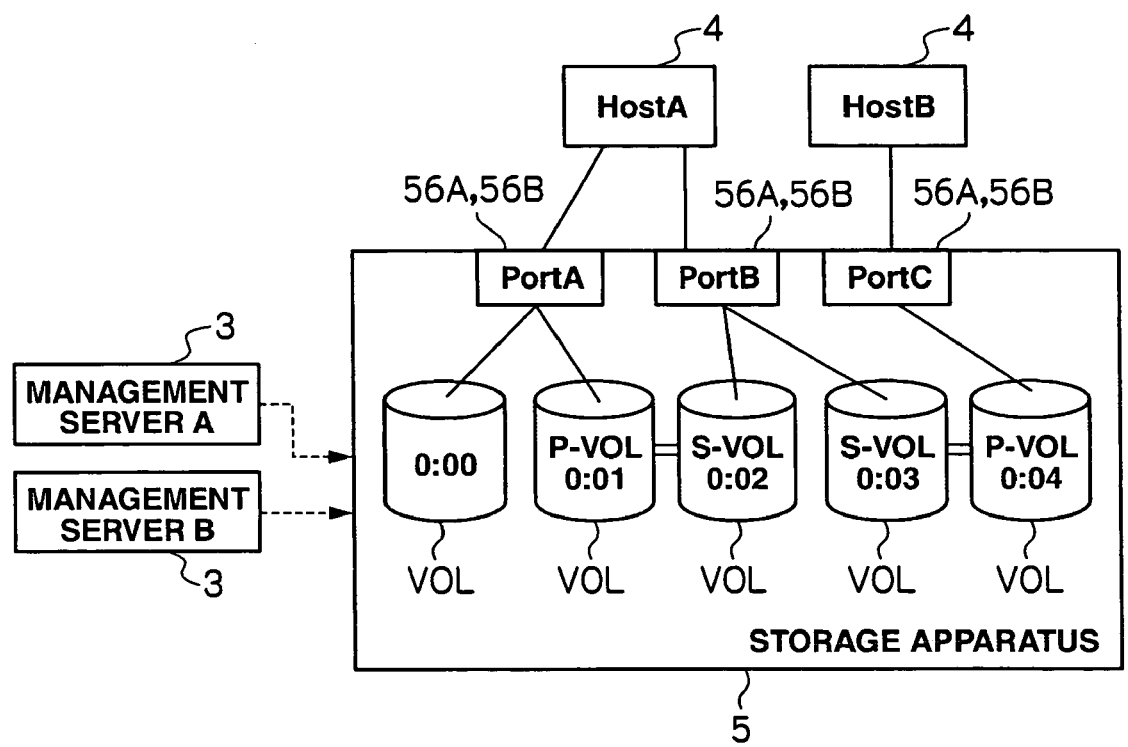
FIG. 12 is a block diagram illustrating Example 1.

It is assumed that, in a state where a first to fifth logical volumes VOL are set in a storage apparatus 5, configuration change operations are performed for the storage apparatus 5 so that: the first and the second logical volumes VOL are connected to a first service server 4 "host A") via first communication ports 56A and 56B "ports A"); the third and the fourth logical volumes VOL are also connected to the first service server 4 "host A") via second communication ports 56A and 56B "ports B"); the fifth logical volume VOL is connected to a second service server 4 "host B") via third communications port 56A and 56B "ports C"); and the second logical volume VOL is paired with the third logical volume VOL while the fourth logical volume VOL is paired with the fifth logical volume VOL, as shown in FIG. 12.

In response to a storage configuration change request from the management client 2 (FIG. 1), a first management server 3 having a path setting role assigned "management server A") transmits, to the storage apparatus 5, storage configuration change request messages to request setting of paths between the first to the fifth logical volumes VOL and the corresponding first and second service servers 4. The messages are sent in order starting with the message requesting a configuration change operation for the first logical volume VOL.

In response to the storage configuration change request messages, the storage apparatus 5 performs configuration change operations to set a path between the first logical volume VOL and the first service server 4 via the first communications ports 56A and 56B and, likewise, to set paths between the second to the fifth logical volumes VOL and the corresponding first and second service servers 4. Each time the storage apparatus 5 performs an operation, it registers the content of the operation in its own configuration change management table 61 (entries identified by the registration numbers "1" to "3," "6" and "7" in FIG. 13(C)) and transmits, to the first management server 3, a storage configuration change reply message including the registration number for the entry for the operation registered in the table 61.

Each time the first management server 3 receives a storage configuration change reply message, it registers the information for the configuration change operation corresponding to the message in its own undo management table 38 as shown in FIG. 13(A).

In synchronization with the first management server 3, a second management server 3 (management server B) assigned with a copy-pair setting role transmits: a storage configuration change request message for requesting pair setting between the second logical volume VOL and the third logical volume VOL; and a storage configuration change request message for requesting pair setting between the fourth logical volume VOL and the fifth logical volume VOL, to the storage apparatus 5 in response to a storage configuration change request from the management client 2.

In response to the storage configuration change request messages, the storage apparatus 5 performs the configuration change operations—pairing the second logical volume VOL with the third logical volume VOL and also pairing the fourth logical volume VOL with the fifth logical volume VOL. Each time the storage apparatus 5 performs an operation, it registers the content of the processing in its own configuration change management table 61 and transmits, to the second management server 3, the registration number for the entry for the operation registered in the table 61 as a storage configuration change reply message.

Each time the second management server 3 receives a storage configuration change reply message, it registers the information for the configuration change operation corresponding to the message in its own undo management table 38 as shown in FIG. 13(B).

Figure 14:
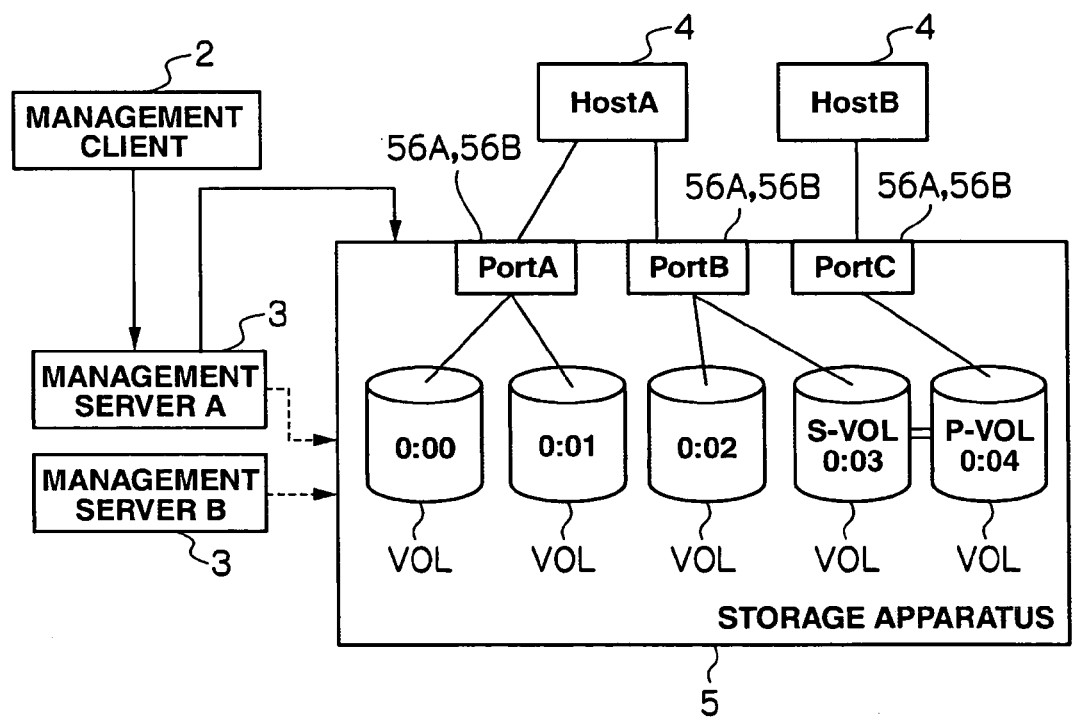
FIG. 14 is another block diagram illustrating Example 1.

After that, if the first management server 3 receives from the management client 2 an undo request requesting that the path between the second logical volume VOL and the first service server 4 (FIG. 14) be deleted, it transmits an undo request message to that effect to the storage apparatus 5.

Having received the undo request message, the storage apparatus 5 specifies the entry for the undo target configuration change operation (the entry identified by the registration number "2" in FIG. 13(C)) by referring to its own configuration change management table 61 and obtains the ID "0:01") of the corresponding logical volume (the second logical volume VOL) from the corresponding "LDEV ID" field 96 in the "undo element" field 95.

The storage apparatus 5 then searches for an entry registered in the configuration change management table 61 later than the entry specified above and its "LDEV ID" field 96 in the "undo element" field 95 has an ID that matches the ID "0:01") of the logical volume VOL obtained as above entered therein.

In the present example, the entry for the configuration change operation to pair the second logical volume VOL with the third logical volume VOL (the entry identified by the registration number "4" in FIG. 13(C)) registered in the configuration change management table 61 corresponds to that entry being searched for.

The storage apparatus 5 then performs the undo processing for the configuration change operation corresponding to the searched entry. The "registration number" field 101 in the "relevant apparatus" field 99 for the specified entry then has a registration number for an entry for a configuration change operation performed relevant to the configuration change operation of the specified entry (the entry identified by its registration number "5" in FIG. 13(C)) entered therein. Accordingly, the storage apparatus 5 performs the undo processing also for the configuration change operation corresponding to the entry identified with a registration number "5." As shown later in FIG. 15(C), the storage apparatus 5 then deletes the entries corresponding to the undo-processed configuration change operations from its own configuration change management table 61.

Then, the storage apparatus 5 again searches for an entry registered in the configuration change management table 61 later than the entry for the configuration change operation the management server 3 requests to undo and its "LDEV ID"

field 96 in the "undo element" field 95 has an ID that matches the ID "0:01") of the logical volume VOL obtained as above entered therein.

This time, only the entry for the configuration change operation requested to be undone by the first management server 3 (the entry identified by the registration number "2") exists in the configuration change management table 61 as an entry including a matching ID. Accordingly, the storage apparatus 5 performs the undo processing for the configuration change operation for that entry and deletes that entry from its own table 61 as shown in FIG. 15(C). It also transmits the result of the undo processing as an undo reply message to the first and the second management servers 3.

Having received the undo reply message, the first management server 3 deletes the corresponding entry (the entry in the second line in FIG. 15(A)) from its own undo management table 38 as shown in FIG. 15(A), notifies the management client 2 of the result of the undo processing, and terminates the undo processing.

The second management server 3, which has also received the undo reply message, deletes the corresponding entries (the entries in the first and the second lines in FIG. 15(B)) from its own undo management table 38 as shown in FIG. 15(B) according to the reflect undo processing result processing routine RT4 described above in relation to FIG. 8.

(2-2) Example 2

An example where a management server 3 performs configuration change operations involving plural storage apparatuses 5 is explained.

Figure 16:
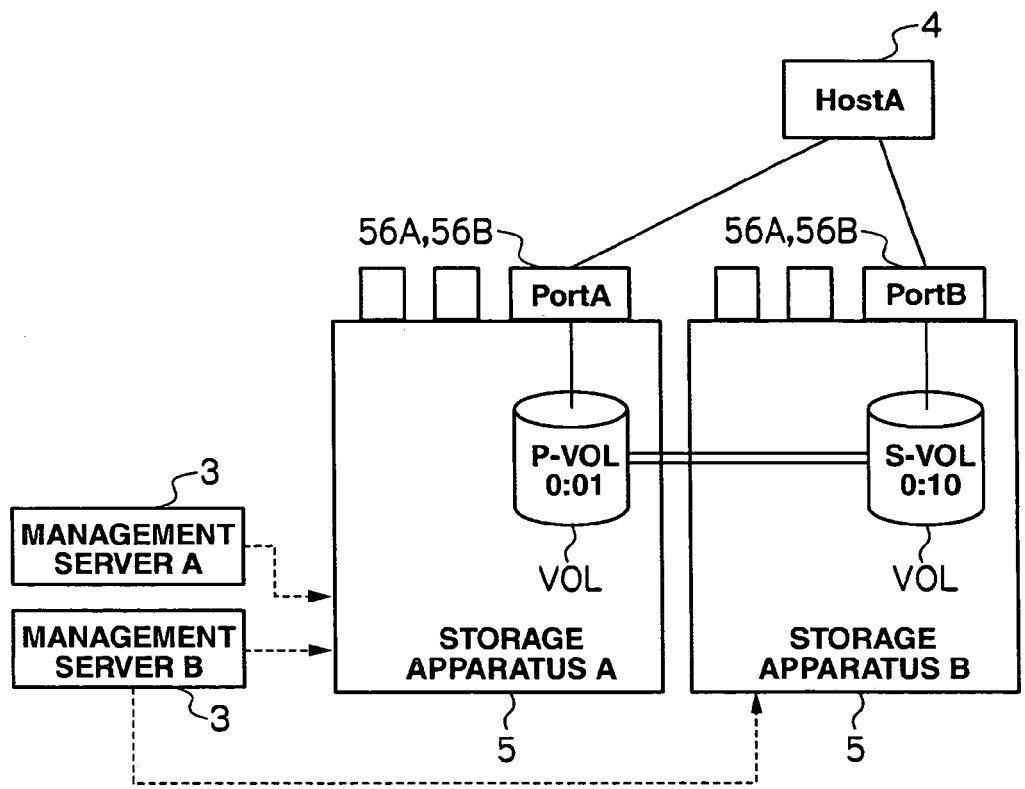
FIG. 16 is a block diagram illustrating Example 2.
Figure 18:
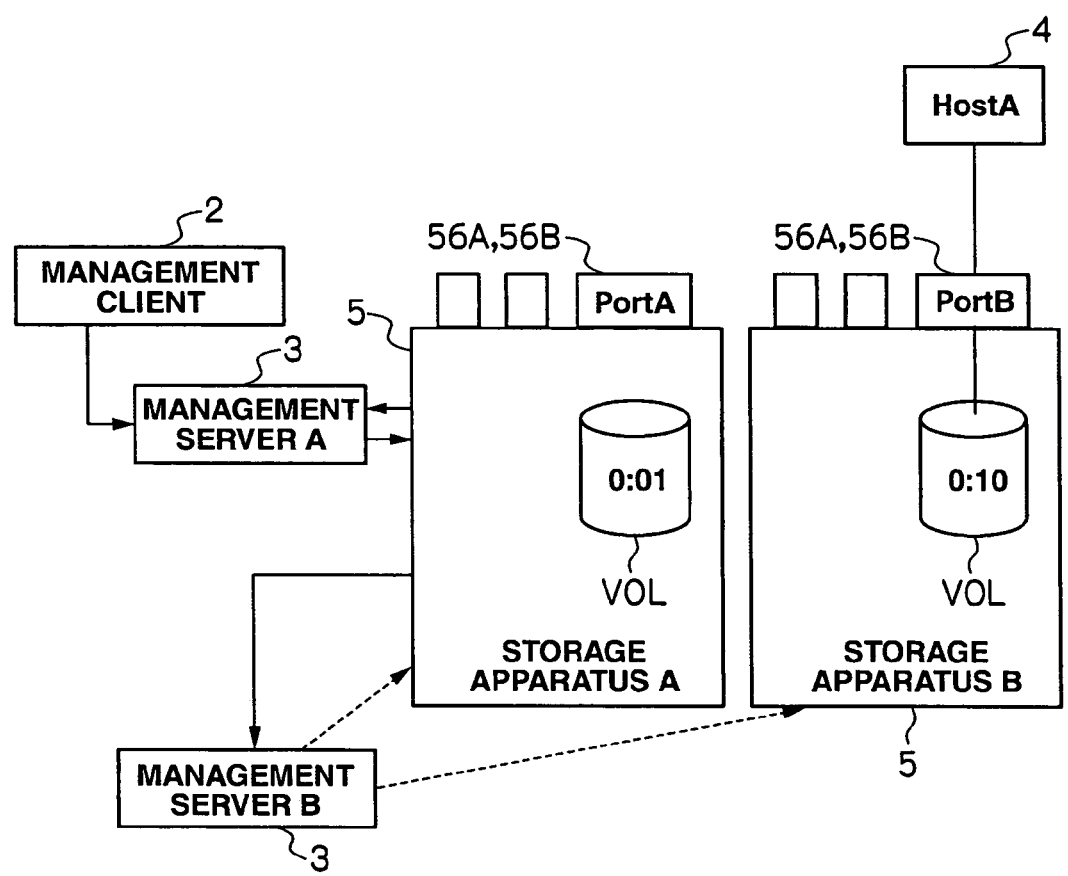
FIG. 18 is another block diagram illustrating Example 2.

It is assumed that configuration change operations are performed so that: the first logical volume VOL in the first storage apparatus 5 "storage apparatus A") is connected to the service server 4 "host A") via the communication ports 56A and 56B "ports A"); the second logical volume VOL in the second storage apparatus 5 "storage apparatus B") is also connected to the service server 4 "host A") via the communication ports 56A and 56B "ports B"); and the first logical volume VOL in the first storage apparatus 5 is paired with the second logical volume VOL in the second storage apparatus 5, as shown in FIG. 16.

In response to a storage configuration change request from the management client 2 (FIG. 1), the first management server 3 "management server A") having the path setting role assigned transmits: a storage configuration change request message requesting that a path be set between the first logical volume VOL and the service server 4 to the first storage apparatus 5; and a storage configuration change request message requesting that a path be set between the second logical volume VOL and the service server 4 to the second storage apparatus 5.

Having received the storage configuration change request message, the first storage apparatus 5 sets a path between the first logical volume VOL and the designated service server 4. It also registers the content of the configuration change processing in its own configuration change management table 61 as shown in FIG. 17(C) (the entry identified by the registration number "1" in FIG. 17(C)), stores the registration number for the entry registered in the table 61 in a storage configuration change reply message; and transmits it to the first management server 3.

Likewise, having received the storage configuration change request message, the second storage apparatus 5 sets a path between the second logical volume VOL and the service server 4. It also registers the content of the configuration change processing in its own storage configuration change management table 61 as shown in FIG. 17(D) (the entry identified by the registration number "1" in FIG. 17(D)); stores the registration number for the entry registered in the table 61 in a storage configuration change reply message; and transmits it to the first management server 3.

Each time the first management server 3 receives a storage configuration change reply message from the first or the second storage apparatuses 5, it registers the entry included in the message in its own undo management table 38 as shown in FIG. 17(A).

In synchronization with the first management server 3 and in response to the storage configuration change request from the management client 2, the second management server 3 assigned the copy-pair setting role transmits a storage configuration change request message requesting that the first logical volume VOL in the first storage apparatus 5 be paired with the second logical volume VOL in the second storage apparatus 5 to both the first and the second storage apparatuses 5,.

Having received the storage configuration request message, the first storage apparatus 5 performs a pair-setting operation to pair the first logical volume VOL in its own apparatus with the second logical volume VOL in the second storage apparatus 5. Moreover, it registers the content of the configuration change operation in its own configuration change management table 61 (the entry identified by the registration number "2" in FIG. 17(C)) and transmits the registration number of the entry registered in the table 61 as a storage configuration change reply message to the second management server 3.

Likewise, having received the storage configuration change request message, the second storage apparatus 5 performs a pair-setting operation to pair the second logical volume VOL in its own apparatus with the first logical volume in the first storage apparatus 5. Moreover, it registers the content of the configuration change operation in its own configuration change management table 61 (the entry identified by the registration number "2" in FIG. 17(D)) and transmits the registration number for the entry registered in the table 61 as a storage configuration change reply message to the second management server 3.

Each time the second management server 3 receives a storage configuration change reply message from the first or the second storage apparatuses 5, it registers the content of the configuration change operation corresponding to the message in its own undo management table 38.

After that, if the first management server 3 receives, from the management client 2, an undo request to delete the path between the first logical volume VOL in the first storage apparatus 5 and the first service server 4, it transmits an undo request message to the first storage apparatus 5.

Having received the undo request message, the first storage apparatus 5 specifies the entry for the undo target configuration change operation (the entry identified by the registration number "1" in FIG. 17(C)) by referring to its own configuration change management table 61, and obtains the ID "0:01") of the logical volume VOL from the corresponding "LDEV ID" field 96 in the "undo element" field 95.

The first storage apparatus 5 then searches for an entry registered in the configuration change management table 61 later than the entry specified above and its "LDEV ID" field 96 in the "undo element" field 95 has an ID that matches the ID "0:01") of the first logical volume VOL obtained above entered therein.

In the present example, the entry for the configuration change operation to pair the first logical volume VOL in the first storage apparatus 5 with the second logical volume VOL in the second storage apparatus 5 (the entry identified by the registration number "2" in FIG. 17(C)) registered in the configuration change management table 61 corresponds to that entry being searched for.

Incidentally, because the "ID" field 100 in the "relevant apparatus" field 99 for the specified entry has the ID of the second storage apparatus 5 entered therein, it is known that the present configuration change operation was performed involving plural storage apparatuses 5. Accordingly, the first storage apparatus 5 transmits an undo request message to the second management server 3, which has performed a configuration change operation relevant to the present configuration change operation, so that that relevant configuration change is also undone.

Having received the request for undo processing, the second management server 3 refers to its own undo management table 38 and transmits, to the first and the second storage apparatuses 5, an undo request message requesting that the pair of the first logical volume VOL and the second logical volume VOL be deleted.

Having received the undo request message, the first and the second storage apparatuses 5 individually execute the undo processing to delete the pair of the first and the second logical volumes VOL. They also delete the entries for the undo-processed configuration change operations (the entries identified by the registration number "2" in FIGS. 17(C) and (D)) from their own undo management tables 38 as shown in FIGS. 19(C) and (D). They then transmit undo reply messages to the effect that the respective undo processing they performed individually was successful to the second management server 3.

Having received the undo reply messages from the first and the second storage apparatuses 5, the second management server 3 deletes the entries for the undo-processed configuration change operations performed in the first and the second storage apparatuses 5 (the entries in the first and the second lines in the FIG. 17(B)) from its own undo management table 38. It then transmits an undo reply message to the effect that the requested undo processing was successful to the first storage apparatus 5.

After receiving the undo reply message, the first storage apparatus 5 again searches for an entry registered in the configuration change management table 61 later than the entry for the undo-requested configuration change operation and its the "LDEV ID" field 96 in the "undo element" field 95 has an ID that matches the ID "0:01") of the logical volume obtained above entered therein.

This time, only the entry for the configuration change operation requested to be undone by the first management server 3 (the entry identified by the registration number "1" in FIG. 17(C)) exists in the configuration change management table 61 as an entry including a matching ID. Accordingly, the first storage apparatus 5 performs the undo processing for the configuration change operation for that entry and deletes that entry from its own table 61 as shown in FIG. 19(C). It also transmits the result of the undo processing as an undo reply message to the first management servers 3.

Having received the undo reply message, the first management server 3 deletes the corresponding entry (the entry in the second line in FIG. 19(A)) from its own undo management table 38 as shown in FIG. 19(A), notifies the management client of the result of the undo processing, and terminates the undo processing.

(3) Effects of the Embodiment

As described, in the storage system 1, each management server 3 manages the history of configuration change operations it has performed for the storage apparatuses 5 using its own undo management table 38, and each storage apparatus 5 manages the history of configuration change operations it has performed for itself in response to an undo request from a management server 3 using its own configuration change management table 61. When a storage apparatus 5 receives an undo request message from a management server 3, it judges, based on its configuration change management table 61, whether an undo target configuration change operation has involved further relevant configuration change operations for other storage apparatuses 5, and executes undo processing for the target configuration change operation alone if the target configuration change operation has not involved further relevant configuration change operations for other storage apparatuses 5; however, if the target configuration change operation has involved further relevant configuration change operations for other storage apparatuses 5, it makes requests to the management servers 3 that have performed the relevant configuration change operations to undo their configuration change operations.

Accordingly, in the present storage system 1, configuration change operations performed by a single storage apparatus 5 are undone by the storage apparatus 5 itself, while configuration change operations that could not be performed by a single storage apparatus 5 but have involved plural storage apparatuses 5 are undone by the management servers 3 that performed the configuration change operations. Therefore, even if plural management servers 3 perform configuration change operations for storage apparatuses 5, system administrators do not have to contact each other and can individually cancel their configuration change operations by themselves. Consequently, with the present storage system 1, it is possible to facilitate undo processing for configuration change operations that have been performed for storage apparatuses 5 by different system administrators.

(4) Other Embodiments

In the above embodiment, the present invention is applied to a storage system 1 having the configuration as shown in Figs. 1 and 2. However, the present invention is not limited to that case and can be applied to other various kinds of storage systems.

The above embodiment was described for the case where, in a management server 3, a server-side configuration change management unit for managing the history of configuration change operations it performed for storage apparatuses 5 is configured with the CPU 31 controlling all operations of the management server 3 and with the undo management program 36 and the undo management table 38; and in a storage apparatus 5, a storage apparatus-side configuration change management unit for managing the history of configuration changes it performed for itself based on the configuration change operations by the management servers 3 is configured with the CPU 53 controlling all operations of the storage apparatus 5 and with the undo agent program 59 and the configuration change management table 61. However, the present invention is not limited to that case and other types of configurations can be applied to the server-side configuration change management unit and the storage apparatus-side configuration change management unit.

Furthermore, in the above embodiment, an undo management table 38 in each management server 3 is structured as shown in FIG. 3 as a first table for registering first information (information entered in the fields 70 to 78 in FIG. 3) necessary to undo each configuration change operation for each storage apparatus 5. However, the present invention is not limited to that case and the undo management table 38 may have any other structure.

Also, in the above embodiment, a configuration change management table 61 in each storage apparatus 5 is structured as shown in FIG. 4 as a second table for registering second information (information entered in the fields 90 to 101 in FIG. 4) necessary to undo each configuration change. However, the present invention is not limited to that case and the configuration change management table 61 may have any other structure.

The present invention can be applied extensively to a storage system where different administrators perform configuration change operations for storage apparatuses.

What is claimed is:

1. A storage system connected to at least one host server, comprising a plurality of management servers including a first management server and a second management server; and a plurality of storage apparatuses including a first storage apparatus having a first logical volume and a second storage apparatus having a second logical volume, wherein the first management server outputs to the first storage apparatus a path setting request for setting a path between the host server and the first logical volume, and the second management server outputs to the first storage apparatus and the second storage apparatus a pair setting request for setting a pair between the first logical volume and the second logical volume, the first storage apparatus registers path information embedded in the path setting request from the first management server in a first entry in a first management table and sets a path based on the path setting request, and then registers pair information embedded in the pair setting request from the second management server in a second entry that comes after the first entry, and the second storage apparatus registers the pair information in a predetermined entry in a second management table and sets the pair based on the pair setting request from the second management server, after receiving from the first management server a path undo request for deleting the path between the first logical volume and the host server, the first storage apparatus identifies the first entry containing the path information in the first management table and acquires identification information for the first logical volume contained therein, identifies the second entry containing the pair information that comes after the first entry in the first management table and contains the identification information of the first logical volume along with identification information of the second logical volume, identifies the second management server that has output the pair setting request, and transmits to the second management server a pair undo request for deleting the pair between the first logical volume and the second logical volume, the second management server, after receiving the pair undo request, outputs the pair undo request to the first storage apparatus and the second storage apparatus, the first storage apparatus, after receiving the pair undo request, deletes the pair information from the first management table, the second storage apparatus, having received the pair undo request, deletes the pair information from the second management table, the first management server outputs to the second storage apparatus another path setting request for setting a second path between the host server and the second logical volume, the second storage apparatus, based said another path setting request form the first management server, registers second path information in a first entry in the second management table and sets the second path between the host server and the second logical volume, and then registers the pair information in a second entry that comes after the first entry in the second management table and sets the pair, the first management server includes a third management table for registering information of the paths set for the first storage apparatus and the second storage apparatus, and the second management server includes a fourth management table for registering information of the pairs set for the first storage apparatus and the second storage apparatus.

2. The storage system according to claim 1, wherein the first storage apparatus, after setting the path, outputs to the first management server a first response message that corresponds to the path setting request from the first management server and contains a registration number for the first entry in the first management table, the first management server, after receiving the first response message, registers in the third management table the path information and the registration number of the first entry in the first management table, the second storage apparatus, after setting the second path, outputs to the first management server a second response message that corresponds to the path setting request from the first management server and contains a registration number for the first entry in the second management table, and the first management server, after receiving the second response message, registers in the third management table the information about the second path and the registration number of the first entry in the second management table.

3. The storage system according to claim 1, wherein the first storage apparatus, after setting the pair, outputs to the second management server a third response message that corresponds to the pair setting request from the second management server and contains a registration number for the second entry in the first management table, the second management server, after receiving the third response message, registers in the fourth management table the pair information and the registration number of the second entry in the first management table, the second storage apparatus, after setting the pair, outputs to the second management server a fourth response message that corresponds to said another path setting request from the second management server and contains a registration number for the second entry in the second management table, and the second management server, after receiving the fourth response message, registers in the third management table the pair information and the registration number of the second entry in the second management table.

4. The storage apparatus according to claim 3, wherein the first storage apparatus transmits to the second management server a response message indicating that the pair information has been deleted from the first management table, the second storage apparatus transmits to the second management server a response message indicating that the pair information has been deleted from the second management table, the second management server, after receiving from the first storage apparatus and the second storage apparatus the response messages indicating that the pair information has been deleted, deletes the pair information from the fourth management table.

5. The storage system according to claim 4, wherein the second management server deletes from the fourth management table an entry corresponding to the registration number of the second entry in the first management table and another entry corresponding to the registration number of the second entry in the second management table.

6. The storage system according to claim 1, wherein the first storage apparatus, after receiving the path undo request from the first management server, deletes the first entry from the first management table.

7. The storage system according to claim 5, wherein the second management server transmits to the first storage apparatus a message indicating that the entries have been deleted from the fourth management table, and the first storage apparatus, after receiving the message, refers to the first management table to check if there is an entry containing identification information for the first logical volume and deletes the first entry that is identified in the above checking in the first management table.

8. The storage system according to claim 1, further comprising a management client operatively connected to the plurality of the servers including the first management server and the second management server, wherein the first management server receives the path setting request from the management client and the second management server receives the pair setting request from the management client.

* * * * *